April 8, 1952   H. A. ALTORFER   2,592,372
GAS TURBINE SYSTEM WITH MEANS PROVIDING
FOR EXPANSION AND CONTRACTION Filed Nov. 2, 1944   3 Sheets-Sheet 1

Inventor
Hans A. Altorfer
by K. S. Wyman
Attorney

April 8, 1952  H. A. ALTORFER  2,592,372
GAS TURBINE SYSTEM WITH MEANS PROVIDING
FOR EXPANSION AND CONTRACTION
Filed Nov. 2, 1944  3 Sheets-Sheet 2

Inventor
Hans A. Altorfer
by K. S. Wyman
Attorney

April 8, 1952

H. A. ALTORFER 2,592,372

GAS TURBINE SYSTEM WITH MEANS PROVIDING
FOR EXPANSION AND CONTRACTION

Filed Nov. 2, 1944

Inventor
Hans A. Altorfer
by K. S. Wyman
Attorney

Patented Apr. 8, 1952

2,592,372

UNITED STATES PATENT OFFICE 2,592,372

GAS TURBINE SYSTEM WITH MEANS PROVIDING FOR EXPANSION AND CONTRACTION

Hans A. Altorfer, Wauwatosa, Wis., assignor to Allis-Chalmers Manufacturing Company, Milwaukee, Wis., a corporation of Delaware Application November 2, 1944, Serial No. 561,609

19 Claims. (Cl. 60—39.32)

This invention relates generally to high temperature elastic fluid systems and more particularly to the arrangement and interconnection of the separately mounted fluid confining elements of such systems.

The invention is particularly applicable, although in no manner limited, to combustion gas turbine systems in which interconnected elements, such for example as a regenerative compressed air heater and a combustion chamber, are subjected to extremely high and rapidly changing temperatures. In systems of this type, it has heretofore been the practice, except for the departure disclosed in James L. Ray's Patent No. 2,345,540 for Turbine System, granted March 28, 1944, to interconnect only the fixed portions of such elements in order to eliminate or minimize the torsional stressing and damage to the interconnecting conduit or conduit sections. However, the prior practice has not been entirely satisfactory as the relative movement of the interconnected elements is sometimes such as will subject the interconnecting conduit or conduit sections to both torsional and sheer stresses irrespective of the precautionary measures heretofore employed, and as a result the interconnecting conduit and/or the joint portions thereof are frequently overstressed when highly heated and sooner or later damaged.

It is therefore the primary object of this invention to provide an improved interconnection for separately mounted, high-temperature-fluid confining elements which will entirely eliminate overstressing of the interconnecting conduit and/or the joint portions thereof irrespective of the nature of the movement of such elements.

Another object of this invention is to provide an improved combination including separately mounted, high-temperature-fluid confining elements, one or more interconnecting fluid conducting conduit sections, and at least two joint structures correlated to eliminate both the torsional and shear stressing of parts produced by an angular movement of one element relative to the other and by an angular displacement of the axis of the conduit section or sections interconnecting the elements.

Another object of this invention is to provide an improved interconnection for separately mounted, high-temperature-fluid confining elements which is extremely rugged and inexpensive to manufacture and which is effective to entirely eliminate the overstressing of the interconnecting conduit section or sections and/or the joint portions thereof.

Still another object of this invention is to provide an improved interconnection for separately mounted, high-temperature-fluid confining elements which embodies correlations of features and details of construction effective to entirely eliminate the overstressing of the interconnecting conduit section or sections and/or of the joint portions thereof with a minimum number of parts.

A further object of this invention is to provide improved swing-joint constructions which are particularly applicable to the interconnection of separately mounted, high-temperature-fluid confining elements and which are extremely durable, and relatively inexpensive to manufacture.

The construction and operation of apparatus embodying the invention will become readily apparent as the disclosure progresses and more particularly emphasizes features considered of special importance.

Accordingly, the invention may be considered as consisting of the various combinations of elements and of the construction and arrangement of parts thereof as is more fully set forth in the following detailed description and in the appended claims, reference being had to the accompanying drawings, in which:

Fig. 1 schematically illustrates a partial gas turbine system embodying the invention;

Figure 1:
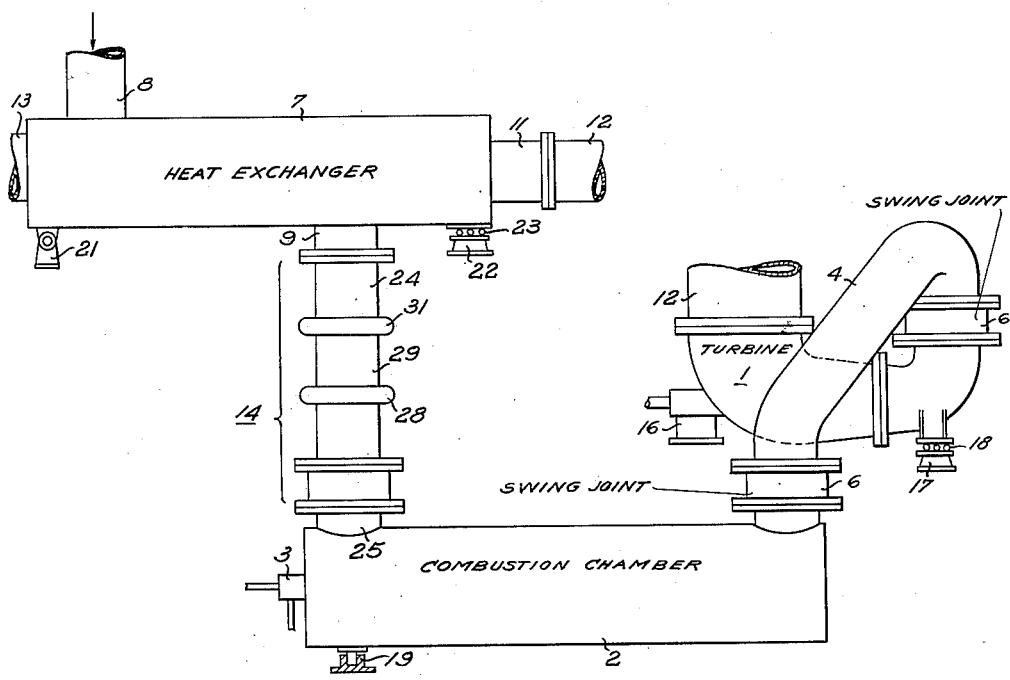

Referring to Fig. 1, it is seen that for purposes of illustration the invention may be applied to a gas turbine system embodying a turbine 1, a fuel burning combustion chamber 2 provided at one end with a burner 3, a conduit 4 connecting the inlet of turbine 1 with the outlet end of combustion chamber 2 and including a pair of spaced swing-joint structures 6, a heat exchanger 7 having a cold air inlet 8, a heated air outlet 9, a hot gas inlet 11 connected with the exhaust of turbine 1 by means of a conduit 12 and a cooled gas outlet 13, and a fluid conducting interconnection 14 placing the burner end of combustion chamber 2 in communication with the heated air outlet 9 of heat exchanger 7.

Turbine 1 has its exhaust end fixedly mounted on an immovable support 16 and has its inlet end slidably mounted on a fixed support 17 by means of rollers 18 permitting the inlet end of the turbine to move longitudinally relative to the support 17 as the turbine expands and contracts in response to temperature changes. Combustion chamber 2 has its inlet or burner end supported on a fixed pivot mounting 19 which permits the burner end of the combustion chamber to move angularly about a vertical axis while preventing an axial or lateral displacement of such end. Consequently, combustion chamber 2 is free to expand and contract longitudinally relative to mounting 19 in accordance with temperature changes. Heat exchanger 7 has its cold air inlet end fixedly mounted against longitudinal movement on an immovable support 21 and has its opposite end slidably supported on a fixed support 22 by means of rollers 23 permitting the hot gas inlet end of the heat exchanger to move longitudinally as the structure expands and contracts in response to temperature changes.

Therefore, it should now be obvious that the portion of heat exchanger 7 embodying heated air outlet 9 may move longitudinally relative to the portion thereof embodying cold air inlet 8 and relative to the burner or inlet end of combustion chamber 2, that the burner end of combustion chamber 2 may move angularly about a vertical axis relative to heat exchager 7, that the discharge or outlet end of combustion chamber 2 may move both angularly and longitudinally relative to turbine 1, and that the inlet end of turbine 1 may also move longitudinally relative to combustion chamber 2. Consequently, it should also be obvious that when the system is shut down and attains a cold or cool inoperative condition, the various elements including conduit 4 will have contracted to assume some such relative positions as those indicated to an exaggerated degree by the dotted lines in Fig. 2, i. e., the inlet end of turbine 1 will have moved from A to $A^1$, the outlet or discharge end of combustion chamber 2 will have moved from B to $B^1$ due to its own longitudinal contraction and to the longitudinal contraction of condiut 4, the latter contraction also causing combustion chamber 2 to move angularly about the vertical axis of pivot support 19, and the heated air outlet 9 of heat exchanger 7 will have moved from C to $C^1$.

Figure 7:
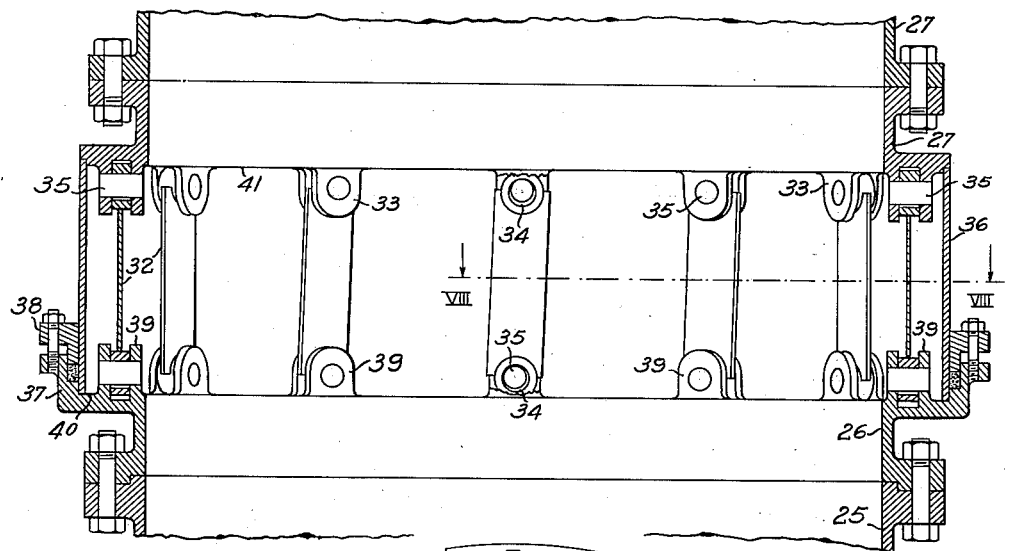
Fig. 7 is an enlarged view of the swing-joint construction shown in Fig. 3 with parts broken away to better show the pivot connection.
Figure 8:
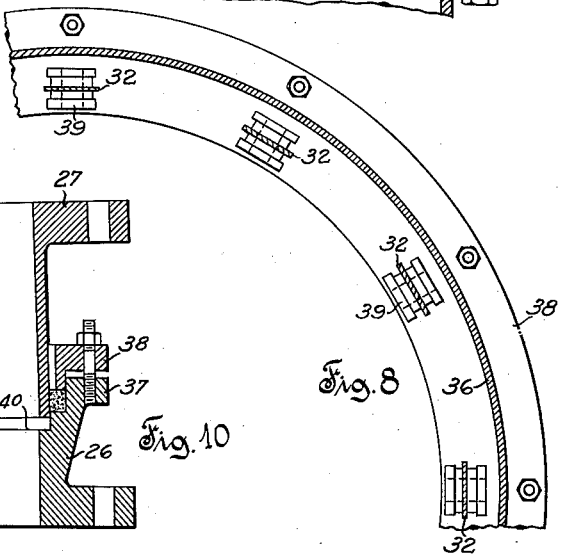
Fig. 8 is a sectional view taken on line VIII—VIII of Fig. 7.

The relative contraction of turbine 1, conduit 4 and combustion chamber 2 results in a relative angular movement of these three elements necessitating the use of at least two swing-joint structures 6 as indicated in Fig. 1 in order to eliminate an over-stressing of parts. These two joints may, if desired, be constructed as shown in Figs. 7 and 8. In addition, the adjacent portions of heat exchanger 7 and combustion chamber 2, in this case the heated air outlet 9 of the heat exchanger and the burner or inlet end of combustion chamber 2, move relatively both angularly and transversely with respect to a straight line intersecting such portions, for example both angularly and transversely with respect to the longitudinal axis of the interconnection represented by the full line designated 14 in Fig. 2. Consequently, the conduit sections and joint structures comprising interconnection 14 are frequently subjected, unless combined and arranged in accordance with this invention, to the damaging effects of both torsional and shear stresses. In this connection it is preferable, in order to minimize a stressing of parts when highly heated, to so correlate combustion chamber 2 and heat exchanger 7 that the longitudinal axis of heated air outlet 9 is alined with the longitudinal axis of the air inlet 25 of combustion chamber 2 when the system is operating under conditions of maximum temperature. Such an arrangement of these elements is clearly shown or indicated in Figs. 1, 2, 3 and 5.

Referring particularly to Figs. 3, 4, 7 and 8 it is seen that interconnection 14 may include a first conduit section 24 secured to heated air outlet 9 of heat exchanger 7, a second conduit section 26 secured to inlet 25 of combustion chamber 2, an interposed pair of rigidly united, coaxial conduit sections 27, a joint structure 28 connecting the upper one of rigidly united sections 27 with the adjacent end of a section 29 for relative longitudinal movement with the common axis of the rigidly united sections disposed in either angularly displaced or alined relation with respect to the longitudinal axis of section 29, another joint structure 31 connecting the upper end of conduit section 29 with the adjacent end of section 24 for relative longitudinal movement with the longitudinal axis of section 29 disposed in either angularly displaced or alined relation with respect to the longitudinal axis of section 24 and of heated air outlet 9, and an internal circumferential series of spaced laterally and torsionably flexible, flat members 32 connecting diametrically opposed portions of the lower one of rigidly united sections 27 with similarly arranged diametrically opposed portions of section 26. The last mentioned construction is best shown in Figs. 7 and 8 from which it can be seen that the lower one of rigidly united sections 27 is provided with a group of circumferentially spaced pairs of diametrically opposed, bifurcated pivot pin mountings 33 spacedly surrounded by a cylindrical outer part or skirt portion 36 of the lower section 27, and having its lower portion telescopingly disposed within an upstanding collar portion 37 on section 26, that collar portion 37 mounts an annular packing or seal ring 38 which surrounds and sealingly engages the lower portion of skirt 36, that section 26 is also provided with a group of circumferentially spaced pairs of diametrically opposed, bifurcated pivot pin mountings 39 which are similar in number and arrangement to the pairs fo pivot pin mountings 33 on adjacent section 27, and that each of the pivot pin mountings 33 on section 27 are connected with an axially opposed pivot pin mounting 39 on section 26 by means of a laterally and torsionably flexible flat member 32.

Figure 4:
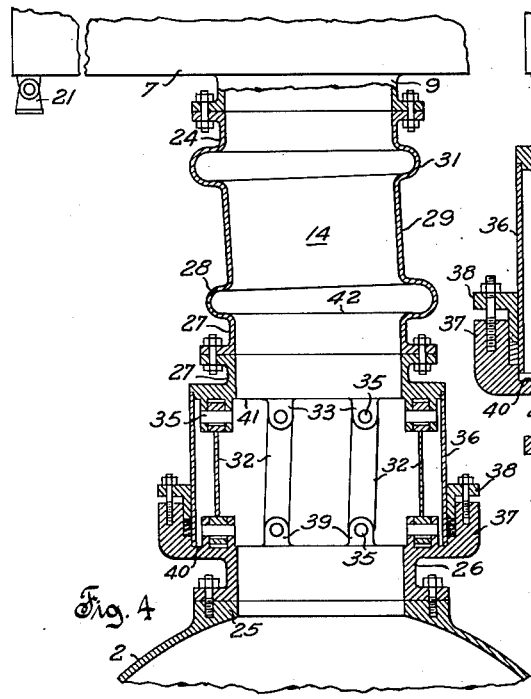
Fig. 4 is a view of the apparatus shown in Fig. 3 with the various parts disposed in the positions which they assume when cold.
Figures 3, 11:
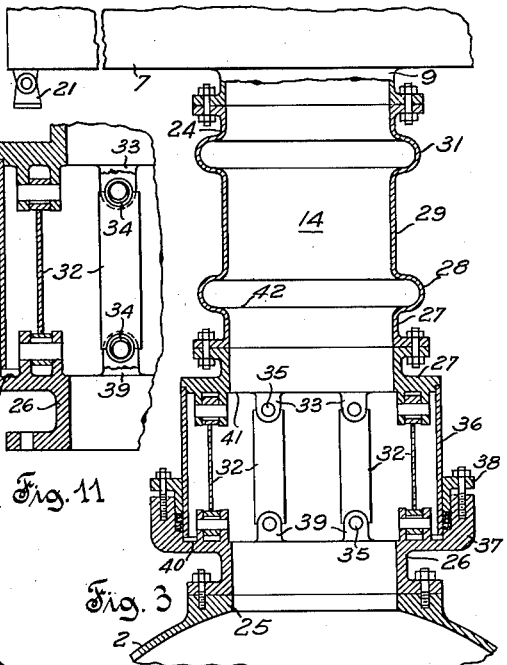
Fig. 3 is an enlarged view of the interconnection between the heat exchanger and combustion chamber with the various parts shown in the positions which they assume when highly heated.
Fig. 11 is an enlarged partial view of the link structure shown in Fig. 3.

When the system shown in Fig. 1 is placed in operation, interconnection 14 will soon become highly heated and if it is of the type shown in Figs. 3 and 4, the various parts will assume the relative positions shown in Fig. 3, i. e., the longitudinal axes of conduit sections 27 and 29 are in substantial alinement with the longitudinal axes of conduit sections 24 and 26 which are in turn always alined with the heated air outlet 9 of heat exchanger 7 and with the inlet 25 of combustion chamber 2, respectively, and in addition, flat members 32 are nearly vertical due to the fact that the movement of combustion chamber 2 angularly about a vertical axis on pivot mounting 19 is sufficient to bring pivot pin mounings 39 on conduit section 26 into substantial vertical alinement with the corresponding pivot pin mountings 33 on adjacent section 27. In this connection, it should be noted that the annular pivot mounting surface 41 on lower section 27 is substantially normal to the longitudinal axis of the section and is of greater area than the opposed similarly disposed surface 42 of joint structure 28, and that therefore, the pressure of the confined fluid acting on such surfaces will produce an upwardly acting unbalanced force which tends to move rigidly united sections 27 upward relative to fixed section 26 thereby placing flat members 32 under tension with the pivot pin receiving openings 34 therein, which are of larger diameter than pivot pins 35, engaging the pivot pins as shown in Fig. 11. It should also be noted that with the various parts thus positioned, the lower end of cylindrical skirt portion 36 of lower section 27 is vertically spaced from the axially opposed surface portion 40 of collar 37. Joint structures 28 and 31 are sufficiently flexible to permit the maximum relative longitudinal movement of conduit sections 24, 29 and 27 necessitated by the action of the unbalanced pressure produced force and by the expansion and contraction of interconnected parts including the radial expansion of combustion chamber 2 and of heat exchanger 7.

When the system shown in Fig. 1 is shut down, interconnection 14 will soon become cool or cold and if it is of the type shown in Figs. 3 and 4, the various parts will assume, due to the lack of fluid pressure and to the contraction and relative angular and longitudinal movement of combustion chamber 2 and heat exchanger 7 (see Fig. 2), the relative positions shown in Fig. 4, i. e., the longitudinal axis of conduit section 29 will be disposed at an angle with respect to the longitudinal axis of section 24 and with respect to the longitudinal axis of rigidly united sections 27 which remains in longitudinal alinement with the longitudinal axis of section 26, the alined longitudinal axes of heated air outlet 9 and section 24 are disposed in displaced parallel relation with respect to the alined longitudinal axes of sections 27, section 26 and combustion chamber inlet 25, and rigidly united section 26 and combustion chamber inlet 25 have moved angularly relative to rigidly united sections 27 thereby cocking and flexing flat members 32 as indicated in Fig. 7. In this connection, it should be noted (see Fig. 7) that the lower end of cylindrical skirt portion 36 of lower section 27 now abuts and is supported by the axially opposed surface portion of collar 37, and that the flat members 32 hang on the upper pivot mountings 33. The displacement of the longitudinal axes of sections 24 and 29 relative to each other and relative to the longitudinal axes of sections 27 and 26 is permitted by the flexibility of joint structures 28 and 31.

Figure 10:
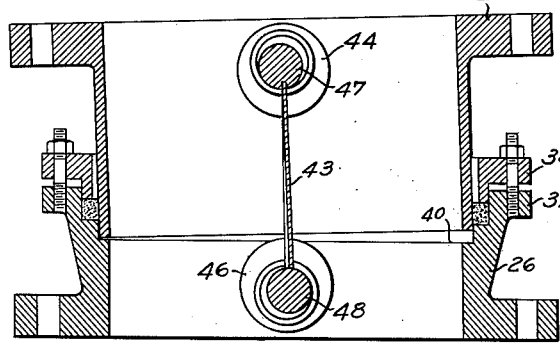
Fig. 10 is a sectional view taken on line X—X of Fig. 9.
Figure 9:
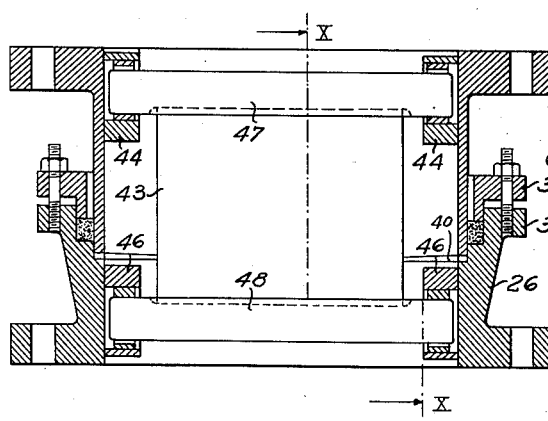
Fig. 9 is an enlarged view of the swing-joint construction shown in Fig. 6 taken on line IX—IX thereof.

Referring now to the modified construction shown in Figs. 5, 6, 9 and 10 in which like numerals are applied to the same or corresponding parts, it is seen that interconnection 14 may also include a first conduit section 24 secured to heated air outlet 9 of heat exchanger 7, a second conduit section 26 secured to inlet 25 of combustion chamber 2, an interposed pair of rigidly united, coaxial conduit sections 27, a joint structure 28 connecting the upper one of rigidly united sections 27 with the adjacent end of section 24 for relative longitudinal movement with the common axis of the rigidly united sections disposed either at an angle to or alined with the longitudinal axis of section 24 (in this modification section 29 and joint structure 31 art omitted), and a single laterally and torsionably flexible internal plate member 43 pivotally uniting diametrically opposed portions of lower section 27 with similarly arranged diametrically opposed portions of section 26. This last mentioned construction, which is best shown in Figs. 9 and 10, may comprise a first pair of pivot journals 44 carried by diametrically opposed internal portions of lower section 27, a second pair of similarly arranged pivot journals 46 carried by diametrically opposed portions of section 26, a pivot member 47 mounted in journals 44, and a pivot member 48 mounted in journals 46 to extend in axially spaced, parallel relation to pivot member 47, plate member 43 having its opposite edges united, as by welding, with opposed, parallelly extending intermediate portions of pivot members 47 and 48. The lower end portion of lower section 27 coacts with collar 37 and with packing ring 38 on section 26 in much the same manner as does the skirt portion 36 of Figs. 3, 4, 7 and 8.

Figure 12:
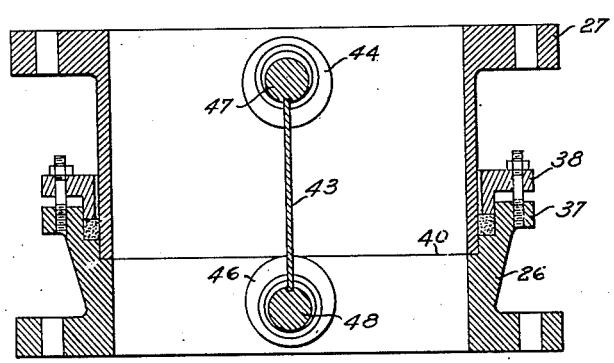
Fig. 12 is an enlarged view of the swing-joint interconnection shown in Fig. 5.
Figure 5:
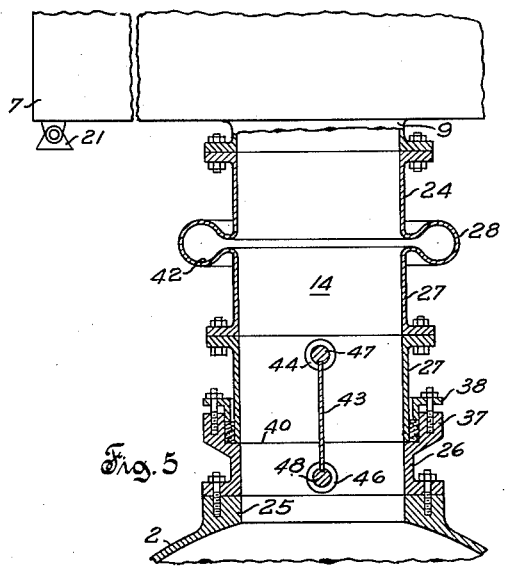
Fig. 5 is a view similar to Fig. 3 showing a modified form of interconnection.

When the system shown in Fig. 1, modified by substituting the form of interconnection shown in Figs. 5, 6, 9 and 10 for that shown in Figs. 3, 4, 7 and 8, is placed in operation, the various parts of the interconnection will soon become highly heated and assume the relative positions shown in Fig. 5, i. e., the longitudinal axis of rigidly united sections 27 are in substantial alinement with the longitudinal axes of fixed sections 24 and 26, and due to the unbalanced downwardly acting force resulting from the pressure of fluid on surface 42 of joint structure 28 (in this modification lower section 27 is not provided with an annular surface 41), the lower end of lower section 27 abuts and is supported by the axially opposed surface portion 49 of collar 37. With the parts thus positioned, the opposite ends of pivot members 47 and 48, which are of less diameter than the journals 44 and 46 receiving same, are disposed as indicated in Fig. 12, i. e., the opposite ends of pivot member 47 engage the lower internal portions of journals 44 thereby suspending the unitary structure comprising pivot member 47, plate member 43 and pivot member 48 therefrom with the opposite ends of pivot member 48 slightly spaced from the lower internal portions of journals 46. However, when the system is shut down and the interconnection becomes cool or cold, the various parts will assume the relative positions shown in Fig. 6, i. e., the longitudinal axis of rigidly united sections 27 will be displaced or tilted at angle with respect to the longitudinal axis of section 24 and with respect to the longitudinal axis of section 26, such tilting being permitted by the flexibility of joint structure 28 and by the lateral and torsional flexibility of plate 43, the alined longitudinal axes of heated air outlet 9 and conduit section 24 will be disposed in displaced parallel relation to the alined longitudinal axes of section 26 and combustion chamber 25, and the opposite ends of pivot members 47 and 48 will engage opposite internal bottom and top side surface portions of journals 44 and 46 as indicated in Fig. 12 thereby placing interconnecting plate member 43 under tension.

Figure 2:
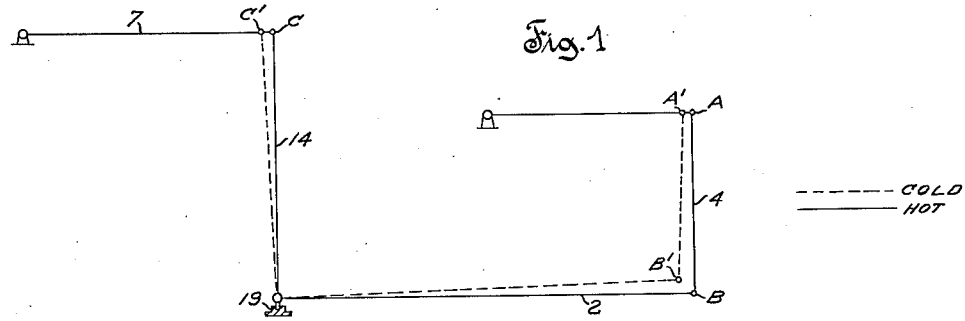
Fig. 2 is a diagrammatic representation of the relative displacement of the various parts shown in Fig. 1.

The modified construction shown in Figs. 5, 6, 9 and 10, which eliminates one of the expansion type joints shown in Figs. 1, 3, 4, 7 and 8, is particularly adapted for use in systems requiring an interconnection between parts having a slight relative angular movement of only one or two degrees such for example as is indicated in Fig. 2 with respect to combustion chamber 2 and heat exchanger 7. However, if the relative angular movement between such parts is relatively large, i. e., two or more degrees, it is preferable to use the type of construction shown in Figs. 3, 4, 7 and 8. Both types of construction herein illustrated operate in much the same manner to eliminate a damaging degree of both torsional and shear stresses and in general are applicable to all types of elastic fluid systems necessitating a fluid conducting interconnection between portions of elements or parts which are so supported that the interconnected portions may move relatively both angularly and transversely with respect to a straight line interconnecting such portions.

Figure 6:
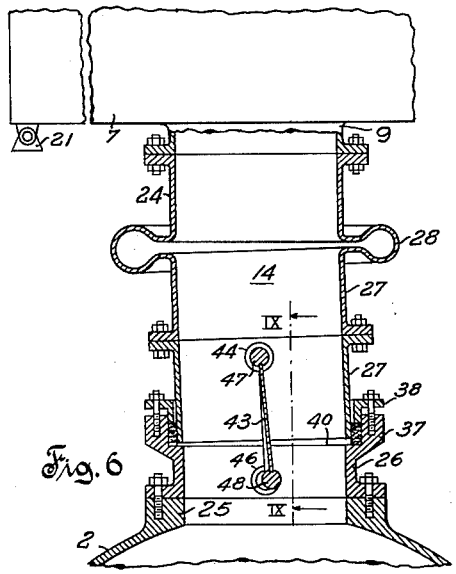
Fig. 6 is a view of the apparatus shown in Fig. 5 with the various parts disposed in the positions which they assume when cold.

However in this connection, it should be noted that when employing the type of swing-joint construction shown in Figs. 9, 10 and 12, the laterally and torsionably flexible plate 43 should be disposed as indicated in Figs. 5 and 6 in order to permit a relatively free lateral flexing of same and a consequent tilting movement of the lower one of rigidly united conduit sections 27.

It should therefore be understood that it is not desired to limit the invention to the exact construction and arrangement of parts herein shown and described for purposes of illustration as various modifications within the scope of the appended claims may occur to persons skilled in the art It is claimed and desired to secure by Letters Patent:

1. In an elastic fluid turbine system, an elongated, regenerative heater having at least one part thereof stationarily mounted on a fixed support, an elongated, motive fluid generator spaced laterally from said heater, means including a pivot support mounting said generator for movement both longitudinally and angularly relative to its support and relative to said heater, and an approximately straight fluid conducting means extending between its ends transversely between and interconnecting said generator with another part of said heater spaced from said one part thereof, said fluid conducting means including a plurality of conduit sections and at least two joint structures connecting said sections and rendering a first pair of joint sections relatively movable angularly about a longitudinally extending axis and rendering the axis of one of a second pair of joined sections displaceable at an angle relative to the axis of the other section of said second pair.

2. In an elastic fluid turbine system, an elongated, regenerative heater, a first supporting structure mounting said heater with parts thereof free to expand and contract in response to temperature changes, an elongated, motive fluid generator spaced laterally from said heater, a second supporting structure mounting said generator for movement both longitudinally and angularly relative to its supporting structure and relative to said heater, and an approximately straight fluid conducting means extending between its ends transversely between and interconnecting said generator with a part of said heater which moves as the heater expands and contracts in response to temperature changes, said fluid conducting means including a plurality of conduit sections and at least two joint structures connecting said sections and rendering a first pair of joint sections relatively movable angularly about a longitudinally extending axis and rendering the axis of one of a second pair of joined sections displaceable at an angle relative to the axis of the other section of said second pair.

3. In an elastic fluid turbine system, an elongated, regenerative heater, a first supporting structure mounting said heater with parts thereof free to expand and contract in response to temperature changes, an elongated, motive fluid generator spaced laterally from said heater, a second supporting structure mounting said generator for movement both longitudinally and angularly relative to its supporting structure and relative to said heater, and an approximately straight fluid conducting means extending between its ends transversely between and interconnecting said generator with a laterally spaced part of said heater which moves as the heater expands and contracts in response to temperature changes, said fluid conducting means including a plurality of conduit sections, a first joint structure connecting one pair of said conduit sections for one of the sections of said pair to turn angularly about its longitudinal axis with its said axis disposed in alinement or at an angle with respect to the longitudinal axis of the other section, and a second joint structure connecting another pair of said conduit sections for relative longitudinal movement with their longitudinal axis disposed in alinement or at an angle with respect to each other.

4. In an elastic fluid turbine system, an elongated, regenerative heater, a first supporting structure mounting said heater with parts thereof free to expand and contract in response to temperature changes, an elongated, motive fluid generator spaced laterally from said heater, a second supporting structure mounting said generator for movement both longitudinally and angularly relative to its supporting structure and relative to said heater, and an approximately straight line fluid conducting means extending between its ends transversely between and interconnecting said generator with a laterally spaced part of said heater which moves as the heater expands and contracts in response to temperature changes, said fluid conducting means including a plurality of conduit sections and a joint structure connecting one pair of said conduit sections for one of the sections of said pair to turn angularly about its longitudinal axis with its said axis disposed in alinement or at an angle with respect to the longitudinal axis of the other section of said pair.

5. In an elastic fluid turbine system, an elongated, regenerative heater element, a first supporting structure mounting said heater with parts thereof free to expand and contract in response to temperature changes, an elongated, motive fluid generator element spaced laterally from said heater, a second supporting structure mounting said generator for movement both longitudinally and angularly relative to its supporting structure and relative to said heater, said heater and generator elements having portions which assume a directly opposed relation when said elements attain their normal operating temperatures, and a fluid conducting means extending between its ends transversely between and interconnecting said directly opposed portions and including a plurality of conduit sections and at least two section-connecting joint structures rendering a first pair of joined sections relatively movable angularly about a longitudinally extending axis and rendering the longitudinal axis of one of a second pair of joined sections displaceable at an angle with respect to the longitudinal axis of the other section of said second pair.

6. In an elastic fluid turbine system, a regenerative heater, a first supporting structure mounting said heater with parts thereof free to expand and contract in response to temperature changes, a motive fluid generator spaced from said heater, a second supporting structure mounting said generator for movement both longitudinally and angularly relative to its supporting structure and relative to said heater, a first conduit section secured to and communicating with a part of said heater which moves as the heater expands and contracts in response to temperature changes, a second conduit section secured to and communicating with said generator for movement therewith, and fluid conducting means interconnecting said first and second sections comprising an interposed pair of rigidly united coaxial sections, a first joint structure connecting one end of said rigidly united sections with said second section for angular movement of said second section about its longitudinal axis relative to said rigidly united sections with the longitudinal axis of the rigidly united sections disposed in out-of-line relation with respect to the longitudinal axis of at least one of said first and second sections, and means including at least one additional joint structure connecting the other end of said rigidly united sections with said first section for relative longitudinal movement with the longitudinal axis of the rigidly united sections disposed in alinement or at an angle with respect to the longitudinal axis of said first section.

7. In an elastic fluid turbine system, a regenerative heater, a first supporting structure mounting said heater with parts thereof free to expand and contract in response to temperature changes, a motive fluid generator spaced from said heater, a second supporting structure mounting said generator for movement both longitudinally and angularly relative to its supporting structure and relative to said heater, a first conduit section secured to and communicating with a part of said heater which moves as the heater expands and contracts in response to temperature changes, a second conduit section secured to and communicating with said generator for movement therewith, and fluid conducting means interconnecting said first and second sections comprising an interposed pair of rigidly united coaxial sections, a first joint structure connecting one end of said rigidly united sections with said second section for angular movement of said second section about its longitudinal axis relative to said rigidly united sections with the longitudinal axis of the rigidly united sections disposed in alinement or at an angle with respect to the longitudinal axis of the second section, and an additional joint structure connecting the other end of said rigidly united sections with said first section for relative longitudinal movement with the longitudinal axis of the rigidly united sections disposed in alinement or at an angle with respect to the longitudinal axis of said first section.

8. In an elastic fluid turbine system, a regenerative heater, a first supporting structure mounting said heater with parts thereof free to expand and contract in response to temperature changes, a motive fluid generator spaced from said heater, a second supporting structure mounting said generator for movement both longitudinally and angularly relative to its supporting structure and relative to said heater, a first conduit section secured to and communicating with a part of said heater which moves as the heater expands and contracts in response to temperature changes, a second conduit section secured to and communicating with said generator for movement therewith, and fluid conducting means interconnecting said first and second conduit sections comprising an interposed pair of rigidly united coaxial sections, a first joint structure coaxially connecting said rigidly united and second sections for relative angular movement about their common longitudinal axis with said common axis disposed in alinement or at an angle with respect to the longitudinal axis of said first section, and means including at least two additional joint structures connecting the other end of said rigidly united sections with said first section for relative longitudinal movement with the common longitudinal axis of said second and rigidly united sections disposed in alinement or at an angle with respect to the longitudinal axis of said first section.

9. A fluid conducting interconnection for high-temperature-fluid confining elements comprising a first conduit section adapted to be secured to one such element for movement therewith, a second conduit section adapted to be secured to the other such element for movement therewith, and means connecting said first and second sections comprising an interposed pair of rigidly united, coaxial conduit sections, means including at least one joint structure connecting one of said rigidly united sections with said first section for relative longitudinal movement with the common longitudinal axis of said rigidly united section disposed in alinement or at an angle with respect to the longitudinal axis of said first section, and a swing-joint structure connecting said second section with the other of said rigidly united sections for relative angular movement with the longitudinal axis of said second section disposed in alined or in out-of-line relation with respect to the longitudinal axis of said first section.

10. A fluid conducting interconnection for high-temperature fluid confining elements comprising a first conduit section adapted to be secured to one such element for movement therewith, a second conduit section adapted to be secured to the other such element for movement therewith, and means connecting said first and second sections comprising an interposed pair of rigidly united, coaxial conduit sections, means including at least one joint structure connecting one of said rigidly united sections with said first section for relative longitudinal movement with the common longitudinal axis of said rigidly united sections disposed in alinement or at an angle with respect to the longitudinal axis of said first section, and means connecting diametrically opposed portions of said second section with similarly arranged diametrically opposed portions of the other of said rigidly united sections comprising at least one laterally and torsionably flexible, flat, internal member disposed in approximately parallel relation with respect to the direction of fluid flow through said sections.

11. A fluid conducting interconnection for high-temperature-fluid confining elements comprising a first conduit section adapted to be secured to one such element for movement therewith, a second conduit section adapted to be secured to the other such element for movement therewith, and means connecting said first and second sections comprising an interposed pair of rigidly united, coaxial conduit sections, means including at least one joint structure connecting one of said rigidly united sections with said first section for relative longitudinal movement with the common longitudinal axis of said rigidly united sections disposed in alinement or at an angle with respect to the longitudinal axis of said first section, and means connecting diametrically opposed portions of said second section with similarly arranged diametrically opposed portions of the other of said rigidly united sections comprising an internal circumferential series of spaced, laterally and torsionably flexible, flat members disposed in approximately parallel relation with respect to each other and with respect to the direction of fluid flow.

12. A fluid conducting interconnection for high-temperature-fluid confining elements comprising a first conduit section adapted to be secured to one such element for movement therewith, a second conduit section adapted to be secured to the other such element for movement therewith, and means connecting said first and second sections comprising an interposed pair of rigidly united, coaxial conduit sections, means including at least one joint structure connecting one of said rigidly united sections with said first section for relative longitudinal movement with the common longitudinal axis of said rigidly united sections disposed in alinement or at an angle with respect to the longitudinal axis of said first section, and means connecting diametrically opposed portions of said second section with similarly arranged diametrically opposed portions of the other of said rigidly united sections comprising a laterally and torsionably flexible internal plate member diametrically disposed in approximately parallel relation with respect to the direction of fluid flow.

13. A fluid conducting interconnection for high-temperature-fluid confining elements comprising a first conduit section adapted to be secured to one such element for movement therewith, a second conduit section adapted to be secured to the other such element for movement therewith, and means connecting said first and second sections comprising an interposed pair of rigidly united, coaxial conduit sections, means including at least one joint structure connecting one of said rigidly united sections with said first section for relative longitudinal movement with the common longitudinal axis of said rigidly united sections disposed in alinement or at an angle with respect to the longitudinal axis of said first sections, and a swing-joint structure connecting said second section with the other of said rigidly united sections said swing-joint structure including a first pin member having its opposite ends pivotally supported by diametrically opposed portions of said other rigidly united section, a second pin member similarly supported by said second section in spaced parallel relation with respect to said first pin member, and a laterally and torsionably flexible plate member uniting opposed, parallelly extending intermediate portions of said pin members.

14. In a swing-joint construction including a pair of telescopingly arranged conduit sections, means uniting said sections for relative angular and longitudinal movement comprising a first group of circumferentially spaced pivots carried by diametrically opposed, internal portions of one section, an axially spaced second group of similarly arranged pivots carried by diametrically opposed internal portions of the other section, and at least one laterally and torsionably flexible, flat member interconnecting said pivots and disposed in approximately parallel relation with respect to the longitudinal axis of said sections.

15. In a swing-joint construction including a pair of telescopingly arranged conduit sections, means uniting said sections for relative angular and longitudinal movement comprising a first group of circumferentially spaced pivots carried by diametrically opposed, internal portions of one section, an axially spaced second group of similarly arranged pivots carried by diametrically opposed internal portions of the other section, and a circumferential series of spaced, laterally and torsionably flexible, flat members interconnecting pairs of axially spaced, opposed pivots with said members disposed in approximately parallel relation with respect to the longitudinal axis of said sections.

16. In a swing-joint construction including a pair of telescopingly arranged conduit sections, means uniting said sections for relative angular and longitudinal movement comprising a first group of circumferentially spaced pivots carried by diametrically opposed, internal portions of one section, an axially spaced second group of similarly arranged pivots carried by diametrically opposed internal portions of the other section, a first pin member supported by said first group of pivots, a second pin member supported by said second group of pivots in spaced parallel relation with respect to said first pin member, and a laterally and torsionably flexible plate member uniting opposed, parallelly extending intermediate portions of said pin members.

17. In combination, a first high temperature fluid confining element, means anchoring a first portion of said element, bearing means supporting a second portion of said element remote from said first portion for movement toward and away from said first portion in response to temperature changes, a second high temperature fluid confining element laterally spaced from said first element and having a segment adjacent to said second portion, pivot means for supporting said segment for rotation about an axis intersecting said second portion generally at right angles to the direction of movement of said second portion toward and away from said first portion, said pivot means cooperating with said bearing means to afford relative motion between said elements both angularly and transversely with respect to said axis, and a substantially straight-line fluid conducting means extending between said second portion and said segment and including a plurality of conduit sections and at least two joint structures connecting and rendering a first pair of joined conduit sections relatively rotatable about said axis and rendering a second pair of joined conduit sections relatively movable in the direction of said axis, said sections being disposed in axial alinement or at an angle with respect to each other.

18. In combination, a first fluid confining element, a second fluid confining element, means supporting said elements for relative movement of adjacent portions thereof both angularly and transversely with respect to a straight line intersecting said portions, and an approximately straight-line fluid conducting means interconnecting said portions and including a pair of relatively rotatable conduit sections relatively movable toward and away from each other in the direction of said straight line and relatively movable angularly with respect to said straight line, and means uniting diametrically opposed portions of one section with similarly arranged diametrically opposed portions of the other section comprising a laterally and torsionably flexible internal plate member disposed approximately at right angles with respect to the direction of said transverse movement and in approximately parallel relation with respect to the direction of fluid flow to afford a limited rotation of said one section relative to said other section about the common longitudinal axis of said sections in response to relative angular and transverse movement of said elements with respect to said straight line.

19. In combination, a first fluid confining element, a first supporting structure mounting said first element with parts thereof free to expand and contract in response to temperature changes, a second fluid confining element spaced from said first element, a second supporting structure mounting said second element for moving angularly about an axis intersecting said first element relative to its supporting structure and relative to said first element, and an approximately straight-line fluid conducting means interconnecting said second element with a part of said first element which moves transversely relative to the longitudinal axis of said fluid conducting means, said fluid conducting means including a pair of relatively rotatable conduit sections relatively movable toward and away from each other in the direction of said longitudinal axis and relatively movable angularly with respect to said longitudinal axis and means connecting diametrically opposed portions of one section with similarly arranged diametrically opposed portions of the other section comprising a laterally and torsionably flexible internal plate member pivotally connected to each of said sections and disposed approximately at right angles with respect to the direction of transverse movement of said part of the first element and in approximately parallel relation with respect to the direction of fluid flow to afford a limited rotation of said one section relative to said other section about the common longitudinal axis of said sections in response to relative angular and transverse movement of said elements with respect to said straight line.

HANS A. ALTORFER.

REFERENCES CITED

The following references are of record in the file of this patent:

UNITED STATES PATENTS

| Number | Name | Date |
| --- | --- | --- |
| 401,102 | Armour | Apr. 9, 1889 |
| 704,988 | Vanstone | July 15, 1902 |
| 1,165,449 | Rietz | Dec. 28, 1915 |
| 1,197,496 | Jobling | Sept. 5, 1916 |
| 1,720,323 | Freiday | July 9, 1929 |
| 1,792,469 | Andersson | Feb. 17, 1931 |
| 1,814,627 | Allen | July 14, 1931 |
| 2,081,149 | Meininghaus | May 25, 1937 |
| 2,314,776 | Dittus | Mar. 23, 1943 |
| 2,345,540 | Ray | Mar. 28, 1944 |
| 2,355,440 | Howard | Aug. 8, 1944 |
| 2,418,800 | Wilson | Apr. 8, 1947 |

FOREIGN PATENTS

| Number | Country | Date |
| --- | --- | --- |
| 283,224 | Italy | Mar. 5, 1931 |